US012571144B2

(12) United States Patent
Wang et al.

(10) Patent No.: US 12,571,144 B2
(45) Date of Patent: Mar. 10, 2026

(54) LIGHT WEIGHT MELT BLOWN WEBS WITH IMPROVED BARRIER PROPERTIES

(71) Applicant: BOREALIS AG, Linz (AT)

(72) Inventors: Jingbo Wang, Linz (AT); Markus Gahleitner, Linz (AT); Klaus Bernreitner, Linz (AT); Joachim Fiebig, Linz (AT); Henk Van Paridon, Averbode (BE); Wilhelmus Sars, Tilburg (NL); Gustaf Tobieson, Stenungsund (SE)

(73) Assignee: BOREALIS AG, Vienna (AT)

( * ) Notice: Subject to any disclaimer, the term of this patent is extended or adjusted under 35 U.S.C. 154(b) by 930 days.

(21) Appl. No.: 17/780,545

(22) PCT Filed: Dec. 3, 2020

(86) PCT No.: PCT/EP2020/084429

§ 371 (c)(1),
(2) Date: May 27, 2022

(87) PCT Pub. No.: WO2021/110815

PCT Pub. Date: Jun. 10, 2021

(65) Prior Publication Data

US 2023/0025875 A1 Jan. 26, 2023

(30) Foreign Application Priority Data

Dec. 4, 2019 (EP) .................................... 19213507

(51) Int. Cl.

*D04H 3/16* (2006.01)
*C08F 110/06* (2006.01)
*D04H 3/007* (2012.01)

(52) U.S. Cl.

CPC ............. *D04H 3/16* (2013.01); *C08F 110/06* (2013.01); *D04H 3/007* (2013.01); *C08F 2500/12* (2013.01); *C08F 2500/34* (2021.01)

(58) Field of Classification Search

CPC ......... D04H 3/16; D04H 3/007; C08F 110/06; C08F 2500/12; C08F 2500/34
See application file for complete search history.

(56) References Cited

U.S. PATENT DOCUMENTS

| | | | |
|---|---|---|---|
| 5,723,217 | A | 3/1998 | Stahl et al. |
| 9,321,914 | B2 | 4/2016 | Holtcamp et al. |
| 10,883,197 | B2 | 1/2021 | Lief et al. |
| 2004/0138350 | A1 | 7/2004 | Haremza et al. |
| 2009/0259009 | A1 | 10/2009 | Fuchs et al. |
| 2013/0137329 | A1 | 5/2013 | Van Paridon et al. |
| 2016/0208028 | A1 | 7/2016 | Choi et al. |
| 2017/0314172 | A1 | 11/2017 | Fiebig et al. |

FOREIGN PATENT DOCUMENTS

| | | | |
|---|---|---|---|
| CA | 2299274 | A1 | 3/1999 |
| CA | 2825173 | A1 | 8/2012 |
| CN | 102574885 | A | 7/2012 |
| CN | 103917701 | A | 7/2014 |
| CN | 107001503 | A | 8/2017 |
| CN | 107002329 | A | 8/2017 |
| EP | 0887379 | A1 | 12/1998 |
| EP | 1786861 | B1 | 5/2007 |
| EP | 2907841 | A1 | 8/2015 |
| EP | 3034552 | A1 | 6/2016 |
| GB | 2569419 | A | 6/2019 |
| JP | 2009512751 | A | 3/2009 |
| KR | 2017-0087493 | A | 12/2014 |
| KR | 20170077256 | A | 7/2017 |
| KR | 2019-0078500 | A | 12/2017 |
| WO | 199212182 | A1 | 7/1992 |
| WO | 199749737 | A1 | 12/1997 |
| WO | 199924478 | A1 | 5/1999 |
| WO | 1999024479 | A1 | 5/1999 |
| WO | 2000/040789 | A1 | 7/2000 |
| WO | 200068315 | A1 | 11/2000 |
| WO | 200019013 | A1 | 11/2001 |
| WO | 2004000899 | A1 | 12/2003 |
| WO | 2004111095 | A1 | 12/2004 |
| WO | 2007126994 | A1 | 11/2007 |
| WO | 2010052260 | A1 | 5/2010 |
| WO | 2010052263 | A1 | 5/2010 |
| WO | 2010052264 | A1 | 5/2010 |
| WO | 2016096690 | A1 | 6/2016 |
| WO | 2018122134 | A1 | 7/2018 |
| WO | 2019/179959 | A1 | 9/2019 |

OTHER PUBLICATIONS

Applicant: Borealis AG; "Light Weight Melt Blown Webs with Improved Barrier Properties"; International Application No. PCT/EP2020/084429; PCT International Search Report and Written Opinion; dated Feb. 16, 2021; 13 pgs.

Applicant: Borealis AG; European Patent Application No. 19213507.7-1102; Extended European Search Report dated May 14, 2020; 8 pgs.

Total: Solutions for Disposable Absorbent Hygiene Products Total Polypropylene Grades for Nonwovens Total Polyethylene grades for Films & Coat; Sep. 13, 2018, 8 pgs.; URL:https://www.polymers.total.com/sites/g/files/wompnd346/f/atoms/files/8-2couche-culotte.pdf.

Yan, Z.; Bresee, R. R. (1999). Flexible Multifunction Instrument for Automated Nonwoven Web Structure Analysis. Textile Research Journal, 69(11), 795-804. doi:10.1177/004051759906901101.

(Continued)

*Primary Examiner* — Catherine S Branch
*Assistant Examiner* — Andrea Wu
(74) *Attorney, Agent, or Firm* — Tarolli, Sundheim, Covell & Tummino LLP

(57) ABSTRACT

The present invention relates to melt-blown webs having no shots and improved barrier properties, whereby the melt-blown webs are made of a visbroken metallocene-catalyzed propylene homopolymer composition with specified melting temperature $T_m$, content of 2,1 erythro regiodefects and molecular weight distribution (MWD).

16 Claims, No Drawings

(56) References Cited

OTHER PUBLICATIONS

Zhou, Zhe, et al. "A new decoupling method for accurate quantification of polyethylene copolymer composition and triad sequence distribution with 13C NMR." Journal of Magnetic Resonance 187.2 (2007): 225-233.
Wang, Wen-Jun, and Shiping Zhu. "Structural analysis of ethylene/propylene copolymers synthesized with a constrained geometry catalyst." Macromolecules 33.4 (2000): 1157-1162.
Singh, Gurmeet, Ajay V. Kothari, and Virendra K. Gupta. "Triad sequence determination of ethylene-propylene copolymers-application of quantitative 13C NMR." Polymer Testing 28.5 (2009): 475-479.
Resconi, Luigi, et al. "Selectivity in propene polymerization with metallocene catalysts." Chemical Reviews 100.4 (2000): 1253-1346.
Busico, Vincenzo, et al. "Alk-1-ene Polymerization in the Presence of a Monocyclopentadienyl Zirconium (iv) Acetamidinate Catalyst: Microstructural and Mechanistic Insights." Macromolecular rapid communications 28.10 (2007): 1128-1134.
Cheng, H. N., Macromolecules 17 (1984), 1950.
Kakugo, M., Naito, Y., Mizunuma, K., Miyatake, T. Macromolecules 15 (1982) 1150.
Zweifel; Plastic Additives Handbook; 5th Edition 2001; pp. 871-873.
Applicant: Borealis AG; "Light Weight Melt Blown Webs with Improved Barrier Properties"; Chinese Application No. 202080082406.2; First Chinese OA dated Feb. 15, 2023; 22 pgs.
Chinese Application No. 202080082406.2 Decision to Grant issued Jun. 29, 2023.
Korean Application No. 10-2022-7021814, Office Action date Apr. 30, 2024.
Ute Zacharias hat Psarreas, Nitroxide-Mediated Controlled Degradation of Polypropylene, Waterloo, Canada, 2006.
United Arab Emirates Office Action dated Apr. 25, 2024.
Egyptian Application No. EG/P/2022/00676, Office Action received Jan. 8, 2025.
Korean Application No. 10-2022-7021814, Notice of Allowance dated Jan. 13, 2025.

LIGHT WEIGHT MELT BLOWN WEBS WITH IMPROVED BARRIER PROPERTIES

The present invention relates to melt-blown webs having no shots and having improved barrier properties. The melt-blown webs of the invention are made out of a polypropylene composition with specified melting temperature and molecular weight distribution. The present invention is also related to the process to produce said melt-blown webs.

BACKGROUND

A melt-blown web, being a non-woven structure consisting of melt-blown fibers, is typically made in a one-step process in which high-velocity air blows a molten thermoplastic resin from an extruder die tip onto a conveyor or take-up screen to form fine fibered self-bonding web. Although many types of polymers can be employed for melt-blown fibers and fabrics, polypropylene is one of the most commonly used polymers.

Melt-blown webs are widely used in hygiene industry, for which the key properties are the barrier properties, meaning especially hydrohead (water/liquid barrier). In such applications, a high hydrohead is always desired. However, some applications require additionally a high air permeability, while in others a low air permeability is desired. For example, in the construction some diapers, a high hydrohead and at the same time a high air permeability are needed in some areas in order to maintain the health of baby skin, while in other areas, e.g. the place close to the super absorber, a low air permeability in combination with high hydrohead are required, so as to prevent the water vapor from penetrating back to the skin and to keep the baby dry.

Web quality is controlled by many factors such as the uniformity of the fiber distribution in the air stream and adjustment of other manufacturing variables such as processing temperature. Another factor controlling fabric quality is the properties of the polypropylene. Several defects can result from a poor selection of polymer physical properties such as roping, fly, and shot. Shots are pinpoint-sized polypropylene beads in the fabric that affect porosity, uniformity, and hand (texture) of the fabric, and are a principle cause of off-quality fabric. The presence of shots decreases the hydrohead of the web, which is an indirect measure of the porosity and proportional to the liquid barrier of the fabric. The processing temperature is one factor in the final fabric properties. The "optimum" processing temperature is one at which ideal properties of the fabric are achieved such as low shot with good hand and high barrier properties, or good filtration properties.

The processability of polypropylene is crucial in the production of melt-blown webs. The molecular weight distribution (MWD) of the polymer significantly determines the properties and the performance in processing, this characteristic must be controlled. Control of MWD of the PP in conventional reactors is difficult because it requires the addition of chain terminators and chain transfer agents. These operations decrease output of the reactor and are often uneconomical. Therefore, as an alternative, this control is accomplished via a post-reactor operation that is commonly known as degradation of polypropylene (PP).

The degradation of PP is a well-known procedure in polymer processing engineering and the plastics industry. Its importance is based on the fact that by thermally decomposing and, as a result, reducing the length of the carbon chain of the PP, one can obtain different products with controlled rheological properties. Because of that, these products are referred to as Controlled-Rheology Polypropylenes (CR-PP).

In general, it has been concluded that CR-PP resins have lower molecular weight, narrower MWD and reduced viscosity.

The process of degradation needs what is called a "radical initiator".

This is a chemical substance which—under particular circumstances—will promote the formation of free radicals inducing chain degradation. Especially for the PP resins, peroxides have dominated as free radical initiators; CR-PP resins have been produced industrially for years using reactive extrusion processes which employ peroxides as free radical initiators. But also the use of hydroxylamine esters as other source of free radicals is known since some years.

WO 97/49737 describes a process for reducing the molecular weight of polymers at temperatures above 280° C. using so-called NOR-HALS (HALS: Hindered Amino Light Stabilizers) compounds containing the group:

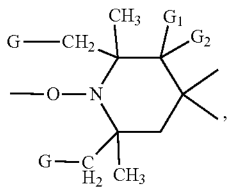

wherein G is hydrogen or methyl and $G_1$ and $G_2$ are each hydrogen, methyl or are together oxo. These known NOR-HALS compounds produce appreciable polymer degradation only at temperatures above 280° C.

WO 01/90113 discloses a process for reducing the molecular weight of polypropylene, propylene copolymers or polypropylene blends, wherein a hydroxylamine ester of the formula:

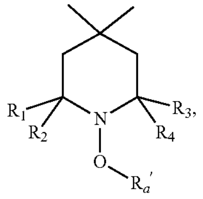

wherein among others $R_a'$ is a monoacyl radical and $R_1$-$R_4$ are alkyl-substituents; is added to the polypropylene polymers to be degraded, and the mixture is heated to temperatures below 280° C.

According to WO 2007/126994 any hydroxylamine ester known in the art for reducing the molecular weight or visbreaking of polyolefin compounds, particularly propylene polymers, can be used. It is referred to WO 01/90113, where such suitable hydroxylamine esters are generally described. Furthermore it is stated that a preferable hydroxylamine ester is Irgatec® CR76, sold commercially by Ciba Specialty Chemicals Corporation (now by BASF). The degraded polypropylene is used for non-woven filter elements.

WO 2007/126994 is silent about the problem of shot formation.

Furthermore EP 1 786 861 discloses the use of hydroxylamine esters as described in WO 01/90113, especially a hydroxylamine ester of formula

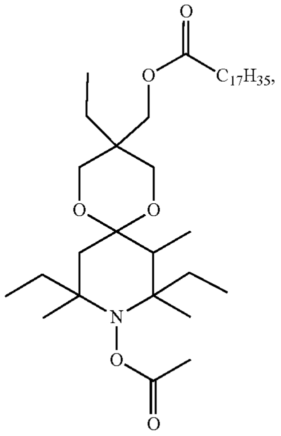

together with a sulphur compound, like Thio-Compound 1 ("Thio-1") of formula

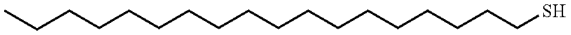 [SMILES: CCCCCCCCCCCCCCCCCCS]

for degrading polypropylene polymers at lower melt extrusion temperatures, like 250° C.

EP 1 786 861 is completely silent about the use of such visbroken polymers for melt-blown webs and the problems of shot formation.

Normally for the manufacture of melt-blown fibers and webs polypropylene polymers are used which have been prepared by using Ziegler-Natta (ZN) catalysts. The performance of polypropylene non-woven webs based on melt-blown (MB) fibers or SMS fabrics (spunbonded/melt-blown/spunbonded) still needs to be improved. For example, avoidance of shots and improved hydrohead (water barrier) of these systems are desired. Thus, although melt-blown webs made out of called "controlled rheology" propylene (CR-PP), which was visbroken either by the use of peroxides or by the use of a hydroxylamine ester are known quite some years in the art, there is still a need for improvement of the web quality, by avoiding the presence of shots and improving the barrier properties.

Surprisingly, the inventors found much improved barrier properties are achieved with melt blown webs made from composition of metallocene based polypropylene and a hydroxylamine ester compound.

Accordingly, the present invention provides a melt-blown web comprising a polypropylene composition comprising (a) 90.000-99.999 wt % of a propylene homopolymer (HPP) polymerized in the presence of a metallocene catalyst, wherein the propylene homopolymer (H—PP) has a content of 2,1 erythro regiodefects as determined from $^{13}C$-NMR spectroscopy in the range from 0.30 to 0.80 mol %, and (b) 0.001-10.000 wt % of a hydroxylamine ester compound, wherein the polypropylene composition in said melt-blown web has (i) a melting temperature ($T_m$) measured by differential scanning calorimetry (DSC) according to ISO 11357 in the range from 152 to 160° C., (ii) a molecular weight $M_w$(web) (measured with GPC on the webs) of between 20000-200000 g/mol, and (iii) a molecular weight distribution (MWD) of between 1.5-5.0.

In another aspect the present invention relates to a process for preparing a melt-blown web, comprising the steps of:

(i) polymerizing a propylene homopolymer (HPP) the presence of a metallocene catalyst system, wherein the propylene homopolymer (H—PP) has a content of 2,1 erythro regiodefects as determined from $^{13}C$-NMR spectroscopy in the range from 0.30 to 0.80 mol %, (ii) mixing 90.000 to 99.999 wt % of the propylene homopolymer (HPP) obtained in step (i) together with 0.001-10.000 wt % of a hydroxylamine ester compound, (iii) pelletizing the mixture obtained in step (ii) is in a pelletizer, (iv) melt-blowing the blend pellets obtained in step (iii) into webs.

Furthermore the present invention relates to the use of a polypropylene composition in melt-blown webs comprising (a) 90.000-99.999 wt % of a propylene homopolymer (HPP) polymerized in the presence of a metallocene catalyst, wherein the propylene homopolymer (H—PP) has a content of 2,1 erythro regiodefects as determined from $^{13}C$-NMR spectroscopy in the range from 0.30 to 0.80 mol %, and (b) 0.001-10.000 wt % of a hydroxylamine ester compound, wherein the polypropylene composition in said melt-blown webs has (i) a melting temperature($T_m$) measured by differential scanning calorimetry (DSC) according to ISO 11357 in the range from 152 to 160° C., (ii) a molecular weight $M_w$(web) (measured with GPC on the webs) of between 20000-200000 g/mol, and (iii) a molecular weight distribution (MWD) of between 1.5-5.0, for improving the melt blown web quality characterized by the increased hydrohead determined according to standard test WSP 80.6 (09).

In the following the invention is described in more detail.

The polypropylene composition suitable for the present invention is visbroken. Accordingly, the said polypropylene composition comprises as component (a) a propylene homopolymer and as component (b) a hydroxylamine ester compound as visbreaking agent.

It is essential that the polypropylene composition in said melt-blown webs of the present invention has a relatively high melting temperature ($T_m$) measured on the webs in the range from 152 to 160° C. For example, the polypropylene composition has a melting temperature $T_m$ measured by differential scanning calorimetry (DSC) according to ISO 11357 in the range from 152 to 158° C., preferably in the range from 152 to 156° C.

Further, it is required that the polypropylene composition after visbreaking has a molecular weight $M_w$(web) (measured with GPC on the webs) of between 20000-200000 g/mol, preferably of between 30000-100000 g/mol, more preferably of between 35000-90000 g/mol. It is also required that after visbreaking the polypropylene composition has a molecular weight distribution (MWD) measured according to ISO 16014 in the range from 1.5 to 5.0, more preferably in the range from 1.8 to 4.0, even more preferably in the range from 2.0 to 3.5, and most preferably in the range from 2.0 to 3.2, such as 2.1 to 3.0.

One preferred requirement of the polypropylene composition has a final $MFR_2$ (230° C., 2.16 kg) determined on the melt blown webs according to ISO 1133 in the range of 600.0-5000.0 g/10 min, preferably in the range of 600.0-3000.0 g/10 min, more preferably in the range of 700.0-2500.0 g/10 min, yet more preferably in the range of 800.0-2000.0 g/10 min.

Thus the polypropylene composition has a molecular weight $M_w$ (measured with GPC) after visbreaking of below 180 000 g/mol, preferably below 160 000 g/mol, more preferably below 150 000 g/mol and most preferably below 140 000 g/mol.

Preferably the polypropylene composition has been visbroken with a visbreaking ratio[final $MFR_2$ (230° C./2.16 kg)/initial $MFR_2$ (230° C./2.16 kg)] of 5 to 250, wherein "final $MFR_2$ (230° C./2.16 kg)" is the $MFR_2$ (230° C./2.16 kg) of the polypropylene composition measured on the melt-blown web and "initial $MFR_2$ (230° C./2.16 kg)" is the $MFR_2$ (230° C./2.16 kg) of the polypropylene homopolymer (HPP) before visbreaking.

More preferably, the polypropylene polymer composition has been visbroken with a visbreaking ratio[final $MFR_2$ (230° C./2.16 kg)/initial $MFR_2$ (230° C./2.16 kg)] of 5 to 50.

Even more preferably, the polypropylene composition has been visbroken with a visbreaking ratio[final $MFR_2$ (230° C./2.16 kg)/initial $MFR_2$ (230° C./2.16 kg)] of 5 to 25.

By visbreaking the polypropylene polymer according to the present invention, the molar mass distribution (MWD) becomes narrower because the long molecular chains are more easily broken up or scissored and the molar mass M will decrease, corresponding to a $MFR_2$ increase. Therefore, it is further preferred that the molecular weight ($M_w$) ratio of the $M_w$ of the polypropylene composition measured on the web to the $M_w$ of the propylene homopolymer (HPP) [$M_w$(web)/$M_w$(PP)] is <1, preferably ≤0.90, more preferably ≤0.85, still more preferably ≤0.80 and molecular weight distribution (MWD) ratio of the MWD of the polypropylene composition measured on the web to the MWD of the propylene homopolymer (HPP) [MWD(web)/MWD(PP)] is <1, preferably ≤0.95, more preferably ≤0.90, still more preferably ≤0.85, and most preferably ≤0.80.

Component (a): Propylene Homopolymer (HPP)

According to the present invention, the polypropylene composition comprises 90.000-99.999 wt %, preferably 96.000-99.999 wt %, more preferably 96.500 to 99.500 wt % of a propylene homopolymer (HPP).

The term "propylene homopolymer (HPP)" used in the present invention relates to a polypropylene that consists substantially, i.e. of more than 98.0 wt.-% of, preferably of more than 99.0 wt.-%, even more preferably of more than 99.5 wt.-%, still more preferably of at least 99.8 wt.-%, of propylene units. In a preferred embodiment, only propylene units in the propylene homopolymer (HPP) are detectable.

It is essential that the propylene homopolymer (HPP) has been polymerized in the presence of a metallocene catalyst.

It is preferred that the polypropylene homopolymer (HPP) has an initial melt flow rate $MFR_2$ (230° C., 2.16 kg) measured according to ISO 1133 on the powder or pellets of HPP in the range from 20.0 to 250.0 g/10 min, preferably in the range from 25.0 to 220.0 g/10 min, more preferably in the range from 30.0 to 200.0 g/10 min.

It is also preferred that the propylene homopolymer (HPP) has a xylene cold soluble (XCS) content of equal or below 1.5 wt %, based on the total weight of the propylene homopolymer (HPP). For example, the propylene homopolymer (HPP) has a xylene cold soluble (XCS) content in the range from 0.1 to 1.5 wt %, preferably in the range from 0.3 to 1.2 wt %, more preferably in the range from 0.3 to 1.0 wt %, based on the total weight of the propylene homopolymer (HPP).

The relatively high melting temperature $T_m$ indicates that the propylene homopolymer (HPP) has a rather low content of regiodefects. It is essential that the propylene homopolymer (HPP) has a content of 2,1 erythro regiodefects as determined from $^{13}C$-NMR spectroscopy in the range from 0.30 to 0.80 mol %. More preferably, the propylene homopolymer (HPP) has 2,1 erythro regiodefects in the range from 0.40 to 0.80 mol.-% and most preferably in the range from 0.50 to 0.80 mol.-%, determined by $^{13}C$-NMR spectroscopy, such as 0.60 to 0.70 mol.-%.

Additionally or alternatively, the propylene homopolymer (HPP) has an isotactic triad fraction (mm) determined from $^{13}C$-NMR spectroscopy of at least 97.5%. For example, the propylene homopolymer (HPP) has an isotactic triad fraction (mm) determined from $^{13}C$-NMR spectroscopy of at least 98.5%, more preferably of at least 99.0%, like in the range from 99.0 to 99.9%.

It is preferred that the propylene homopolymer (HPP) is polymerized in the presence of a metallocene catalyst complex of formula (I)

(I)

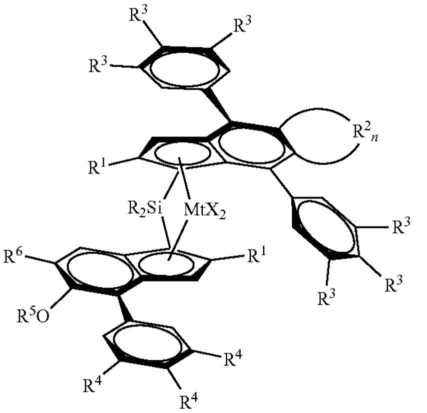

wherein

Mt is Hf or Zr;

each X is a sigma-ligand, each $R^1$ independently are the same or can be different and are a $CH_2$—$R^7$ group, with $R^7$ being H or linear or branched $C_{1-6}$-alkyl group, $C_{3-8}$ cycloalkyl group, $C_{6-10}$ aryl group, each $R^2$ is independently a —CH═, —CY═, —CH2-, —CHY— or —CY2- group, wherein Y is a $C_{1-10}$ hydrocarbyl group and where n is 2-6, each $R^3$ and $R^4$ are independently the same or can be different and are hydrogen, a linear or branched $C_1$-$C_6$-alkyl group, an OY group or a $C_{7-20}$ arylalkyl, $C_{7-20}$ alkylaryl group or $C_{6-20}$ aryl group, whereby at least one $R^3$ per phenyl group and at least one $R^4$ is not hydrogen, and optionally two adjacent $R^3$ or $R^4$ groups can be part of a ring including the phenyl carbons to which they are bonded, $R^5$ is a linear or branched $C_1$-$C_6$-alkyl group, $C_{7-20}$ arylalkyl, $C_{7-20}$ alkylaryl group or $C_6$-$C_{20}$-aryl group, $R^6$ is a $C(R^8)_3$ group, with $R^8$ being a linear or branched $C_1$-$C_6$ alkyl group, each R is independently a $C_1$-$C_{20}$-hydrocarbyl, $C_6$-$C_{20}$-aryl, $C_7$-$C_{20}$-arylalkyl or $C_7$-$C_{20}$-alkylaryl.

The catalyst of the invention can be used in non-supported form or in solid form. The catalyst of the invention may be used as a homogeneous catalyst or heterogeneous catalyst.

The catalyst of the invention in solid form, preferably in solid particulate form, can be either supported on an external carrier material, like silica or alumina, or, in a particularly preferred embodiment, is free from an external carrier, however still being in solid form. For example, the solid catalyst is obtainable by a process in which (a) a liquid/liquid emulsion system is formed, said liquid/liquid emulsion system comprising a solution of the catalyst components (i) and (ii) dispersed in a solvent so as to form dispersed droplets; and (b) solid particles are formed by solidifying said dispersed droplets.

Details about the catalyst used in the present invention is described below.

Definitions

Throughout the description, the following definitions are employed.

By "free from an external carrier" is meant that the catalyst does not contain an external support, such as an inorganic support, for example, silica or alumina, or an organic polymeric support material.

The term "$C_{1-20}$ hydrocarbyl group" includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl. Linear and branched hydrocarbyl groups cannot contain cyclic units. Aliphatic hydrocarbyl groups cannot contain aryl rings.

Unless otherwise stated, preferred $C_{1-20}$ hydrocarbyl groups are $C_{1-20}$ alkyl, $C_{4-20}$ cycloalkyl, $C_{5-20}$ cycloalkyl-alkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tert.-butyl, isobutyl, $C_{5-6}$-cycloalkyl, cyclohexylmethyl, phenyl or benzyl.

The term "halo" includes fluoro, chloro, bromo and iodo groups, especially chloro or fluoro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

The terms "C4 phenyl ring" and "C4' phenyl ring" relate to the substituted phenyl rings attached to the 4 and 4' positions of the indenyl and indacenyl rings, respectively. The numbering of these rings will be evident from the structures indicated herein.

Catalyst activity is defined in this application to be the amount of polymer produced/g catalyst/h. Catalyst metal activity is defined here to be the amount of polymer produced/g Metal/h. The term productivity is also sometimes used to indicate the catalyst activity although herein it designates the amount of polymer produced per unit weight of catalyst.

The term "molecular weight" is used herein to refer to weight average molecular weight $M_w$ unless otherwise stated.

DETAILED DESCRIPTION OF CATALYST

The metallocene catalyst complexes of the invention are chiral, racemic bridged bisindenyl $C_1$-symmetric metallocenes in their anti-configuration. Although the complexes of the invention are formally $C_1$-symmetric, the complexes ideally retain a pseudo-$C_2$-symmetry since they maintain $C_2$-symmetry in close proximity of the metal center although not at the ligand periphery. By nature of their chemistry both anti and syn enantiomer pairs (in case of $C_1$-symmetric complexes) are formed during the synthesis of the complexes. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the scheme below.

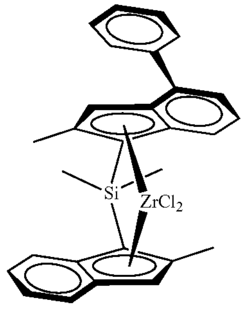

Racemic Anti

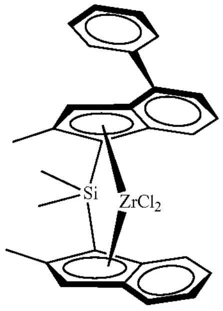

Racemic Syn

Formula (I), and any sub formulae, are intended to cover both syn- and anti-configurations. Preferred metallocene catalyst complexes are in the anti configuration.

The metallocene catalyst complexes of the invention are employed as the racemic-anti isomers. Ideally, therefore at least 95% mol, such as at least 98% mol, especially at least 99% mol of the metallocene catalyst complex is in the racemic-anti isomeric form.

In the metallocene catalyst complexes of the invention the following preferences apply. Metallocene catalyst complexes according to the invention are of formula (I):

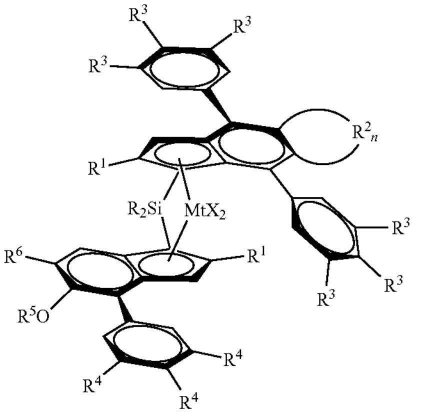

(I)

In a complex of formula (I) it is preferred that Mt is Zr or Hf, preferably Zr.

Each X is a sigma ligand. Most preferably, each X is independently a hydrogen atom, a halogen atom, $C_{1-6}$ alkoxy group or an R' group, where R' is a $C_{1-6}$ alkyl, phenyl or benzyl group. Most preferably, X is chlorine, benzyl or a methyl group. Preferably, both X groups are the same. The most preferred options are two chlorides, two methyl or two benzyl groups, especially two chlorides.

In the formula —$SiR_2$—, each R is independently a $C_1$-$C_{20}$-hydrocarbyl, $C_6$-$C_{20}$-aryl, $C_7$-$C_{20}$-arylalkyl or $C_7$-$C_{20}$-alkylaryl. The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl. Unless otherwise stated, preferred $C_{1-20}$ hydrocarbyl groups are $C_{1-20}$ alkyl, $C_{4-20}$ cycloalkyl, $C_{5-20}$ cycloalkyl-alkyl groups, $C_{7-20}$ alkylaryl groups, $C_{7-20}$ arylalkyl groups or $C_{6-20}$ aryl groups.

Preferably, both R groups are the same. It is preferred that R is a $C_1$-$C_{10}$-hydrocarbyl or $C_6$-$C_{10}$-aryl group, such as methyl, ethyl, propyl, isopropyl, tertbutyl, isobutyl, $C_{5-6}$-cycloalkyl, cyclohexylmethyl, phenyl or benzyl, more preferably both R are a $C_1$-$C_6$-alkyl, $C_{3-8}$ cycloalkyl or $C_6$-aryl group, such as a $C_1$-$C_4$-alkyl, $C_{5-6}$ cycloalkyl or $C_6$-aryl group and most preferably both R are methyl or one is methyl and another cyclohexyl. Most preferably the bridge is —$Si(CH_3)_2$—.

Each $R^1$ independently are the same or can be different and are a $CH_2$—$R^7$ group, with $R^7$ being H or linear or branched $C_{1-6}$-alkyl group, like methyl, ethyl, n-propyl, i-propyl, n-butyl, i-butyl, sec.-butyl and tert.-butyl or $C_{3-8}$ cycloalkyl group (e.g. cyclohexyl), $C_{6-10}$ aryl group (preferably phenyl).

Preferably, both $R^1$ are the same and are a $CH_2$—$R^7$ group, with $R^7$ being H or linear or branched $C_1$-$C_4$-alkyl group, more preferably, both $R^1$ are the same and are a $CH_2$—$R^7$ group, with $R^7$ being H or linear or branched $C_1$-$C_3$-alkyl group. Most preferably, both $R^1$ are both methyl.

Each $R^2$ is independently a —CH═, —CY═, —$CH_2$—, —CHY— or —$CY_2$— group, wherein Y is a $C_{1-10}$ hydrocarbyl group, preferably a $C_{1-4}$ hydrocarbyl group and where n is 2-6, preferably 3-4.

Each substituent $R^3$ and $R^4$ are independently the same or can be different and are hydrogen, a linear or branched $C_1$-$C_6$-alkyl group, an OY group or a $C_{7-20}$ arylalkyl, $C_{7-20}$ alkylaryl group or $C_{6-20}$ aryl group, preferably hydrogen, a linear or branched $C_1$-$C_6$-alkyl group or $C_{6-20}$ aryl groups, and optionally two adjacent $R^3$ or $R^4$ groups can be part of a ring including the phenyl carbons to which they are bonded. More preferably, $R^3$ and $R^4$ are hydrogen or a linear or branched $C_1$-$C_4$ alkyl group or a OY— group, wherein Y is a is a $C_{1-4}$ hydrocarbyl group. Even more preferably, each $R^3$ and $R^4$ are independently hydrogen, methyl, ethyl, isopropyl, tert-butyl or methoxy, especially hydrogen, methyl or tert-butyl, whereby at least one $R^3$ per phenyl group and at least one $R^4$ is not hydrogen.

Thus, preferably one or two $R^3$ per phenyl group are not hydrogen, more preferably on both phenyl groups the $R^3$ are the same, like 3',5'-di-methyl or 4'-tert.-butyl for both phenyl groups.

For the indenyl moiety preferably one or two $R^4$ on the phenyl group are not hydrogen, more preferably two $R^4$ are not hydrogen and most preferably these two $R^4$ are the same like 3',5'-di-methyl or 3',5'-di-tert.-butyl.

$R^5$ is a linear or branched $C_1$-$C_6$-alkyl group such as methyl, ethyl, n-propyl, i-propyl, n-butyl, i-butyl, sec.-butyl and tert.-butyl, $C_{7-20}$ arylalkyl, $C_{7-20}$ alkylaryl group or $C_6$-$C_{20}$ aryl group.

$R^5$ is a preferably a linear or branched $C_1$-$C_6$ alkyl group or $C_{6-20}$ aryl group, more preferably a linear $C_1$-$C_4$ alkyl group, even more preferably a $C_1$-$C_2$ alkyl group and most preferably methyl.

$R^6$ is a $C(R^8)_3$ group, with $R^8$ being a linear or branched $C_1$-$C_6$ alkyl group.

Each R is independently a $C_1$-$C_{20}$-hydrocarbyl, $C_6$-$C_{20}$-aryl, $C_7$-$C_{20}$-arylalkyl or $C_7$-$C_{20}$-alkylaryl. Preferably each $R^8$ are the same or different with $R^8$ being a linear or branched $C_1$-$C_4$-alkyl group, more preferably with $R^8$ being the same and being a $C_1$-$C_2$-alkyl group. Most preferably, all $R^8$ groups are methyl.

In a preferred embodiment, the invention provides a metallocene catalyst complex of formula (Ia):

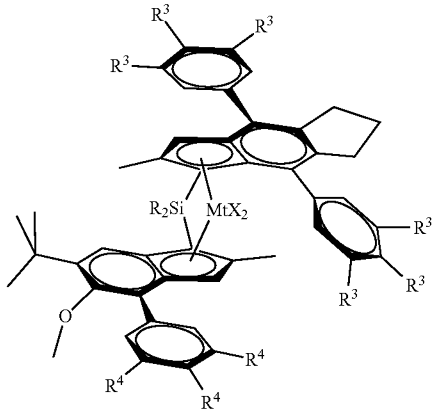

(Ia)

wherein each $R^3$ and $R^4$ are independently the same or can be different and are hydrogen or a linear or branched $C_1$-$C_6$-alkyl group, whereby at least on $R^3$ per phenyl group and at least one $R^4$ is not hydrogen.

Specific metallocene catalyst complexes of the invention include:

rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl] zirconium dichloride rac-anti-dimethylsilanediyl[2-methyl-4,8-bis-(3',5'-dimethylphenyl)-1,5,6,7-tetrahydro-s indacen-1-yl][2-methyl-4-(3',5'-dimethylphenyl)-5-methoxy-6-tert-butylinden-1-yl] zirconium dichloride rac-anti-dimethylsilanediyl[2-methyl-4,8-bis-(3',5'-dimethylphenyl)-1,5,6,7-tetrahydro-s-indacen-1-yl][2-methyl-4-(3',5'-ditert-butyl-phenyl)-5-methoxy-6-tert-butylinden-1-yl] zirconium dichloride or their corresponding zirconium dimethyl analogues.

Throughout the disclosure above, where a narrower definition of a substituent is presented, that narrower definition is deemed disclosed in conjunction with all broader and narrower definitions of other substituents in the application.

Synthesis

The ligands required to form the catalysts of the invention can be synthesized by any process, and the skilled organic chemist would be able to devise various synthetic protocols for the manufacture of the necessary ligand materials. WO2007/116034 discloses the necessary chemistry and is herein incorporated by reference. Synthetic protocols can also generally be found in WO2002/02576, WO2011/135004, WO2012/084961, WO2012/001052, WO2011/076780 and WO2015/158790. The examples section also provides the skilled person with sufficient direction.

Synthesis of the Ligand of the Metallocene Catalyst Complex of Formula (I or Ia) Comprising the Two $(R^3)_3$-Phenyl-Group Substituents, Preferably Indacenyl Ligand Synthesis.

The ligand of the metallocenes as disclosed in PCT/EP2017/084273 include two different indenes, one methoxyindene and one indacene. The synthesis of the methoxyindene is simple and gives high yield, while the synthesis of the indacene requires several steps, as shown in scheme 1 for the case of the 4-(4-tert-butylphenyl)indacene:

Scheme 1

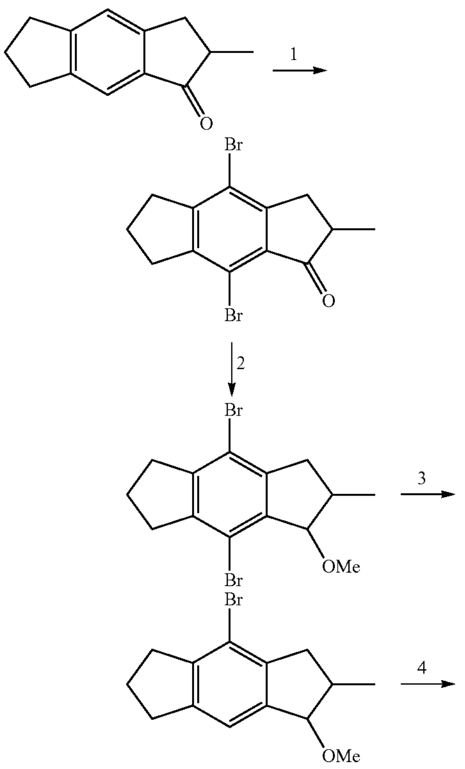

-continued

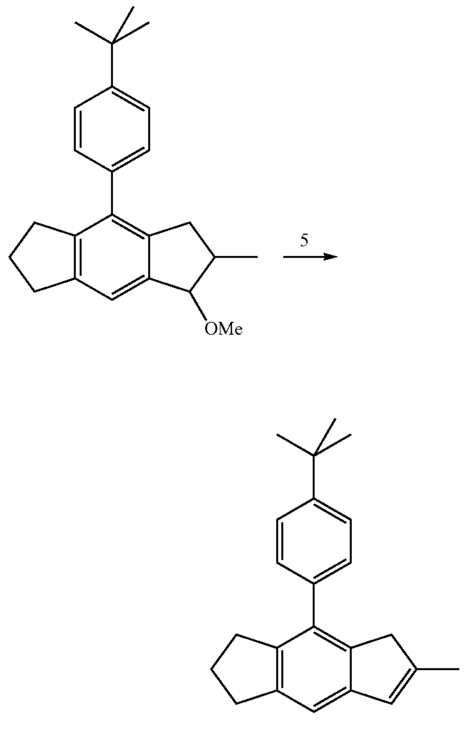

The ligand of the metallocene catalyst complex of formula (I or Ia) comprising the two $(R^3)_3$-phenyl-group substituents, preferably the indacene ligand used in the synthesis of the inventive metallocene catalyst complexes, which is the structural analogue of above structure, is obtained with one step less, as shown in scheme 2:

Scheme 2

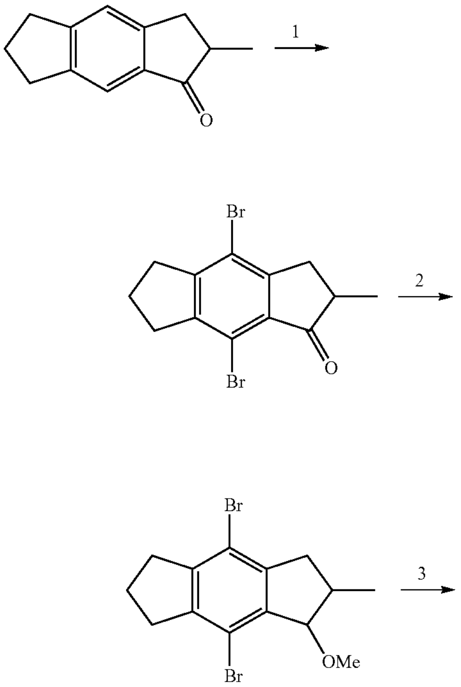

-continued

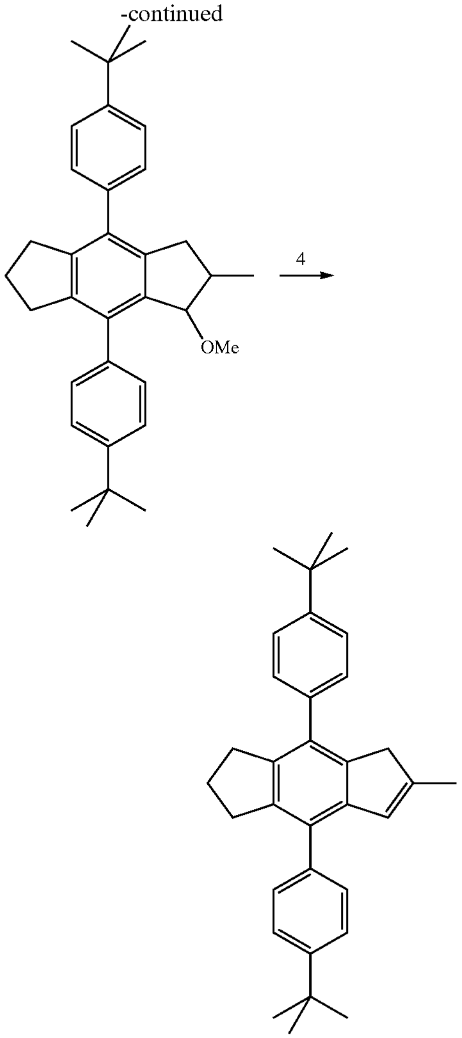

Thus, the new metallocene catalyst complexes of the present invention can be prepared in a simpler way and as is shown in the experimental part in a more efficient way, too.

It is also provided a process for producing the ligand of the metallocene catalyst complex of formula (I or Ia) comprising the two $(R^3)_3$-phenyl-group substituents, preferably the indacene ligand.

This process analogous to scheme 2 comprises the steps

1. Electrophilic dibromination of the starting keton-compound, e.g. $R^1$-3,5,6,7-tetrahydro-s-indecen-1(2H)-one
2. Reduction of the corresponding dibromo-compound, e.g. 4,8-dibromo-$R^1$-3,5,6,7-tetrahydro-s-indecen-1 (2H)-one, followed by methylation to yield the corresponding OMe-compound
3. Kumada coupling with $(R^3)_3$-phenylmagnesium bromide and
4. Demethoxylation Step 1 is preferably done with aluminium chloride in dichlormethane at low temperature, like 2 to 10° C., e.g. around +5° C.

The reduction in step 2 is preferably done by sodium borohydride in THF-MeOH medium at low temperature, like 2 to 10° C., e.g. around +5° C.

The methylation is preferably performed at room temperature with MeI/KOH/DMSO.

Step 3 is preferably done in the presence of $NiCl_2(PPh_3)$ IPr catalyst at reflux temperature and step 4 is preferably done with a catalytic amount of TsOH in toluene at reflux temperature.

Cocatalyst

To form an active catalytic species it is normally necessary to employ a cocatalyst as is well known in the art.

According to the present invention a cocatalyst system comprising a boron containing cocatalyst and/or an aluminoxane cocatalyst is used in combination with the above defined metallocene catalyst complex.

The aluminoxane cocatalyst can be one of formula (X):

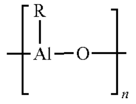
(X)

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_{3-10}$ cycloalkyl, $C_7$-$C_{12}$ arylalkyl or alkylaryl and/or phenyl or naphthyl, and where Y can be hydrogen, halogen, preferably chlorine or bromine, or $C_1$-$C_{10}$ alkoxy, preferably methoxy or ethoxy. The resulting oxygen-containing aluminoxanes are not in general pure compounds but mixtures of oligomers of the formula (X).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used instead of the aluminoxane cocatalyst or the aluminoxane cocatalyst can be used in combination with a boron containing cocatalyst.

It will be appreciated by the skilled man that where boron based cocatalysts are employed, it is normal to pre-alkylate the complex by reaction thereof with an aluminium alkyl compound, such as TIBA. This procedure is well known and any suitable aluminium alkyl, e.g. $Al(C_{1-6}\text{-alkyl})_3$. can be used. Preferred aluminium alkyl compounds are triethylaluminium, tri-isobutylaluminium, tri-isohexylaluminium, tri-n-octylaluminium and tri-isooctylaluminium.

Alternatively, when a borate cocatalyst is used, the metallocene catalyst complex is in its alkylated version, that is for example a dimethyl or dibenzyl metallocene catalyst complex can be used.

Boron based cocatalysts of interest include those of formula (Z)

$$BY_3 \qquad (Z)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl) phenyl. Preferred options are trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(tolyl)borane, tris(3,5-dimethyl-phenyl)borane, tris(3,5-difluorophenyl)borane and/or tris (3,4,5-trifluorophenyl)borane.

Particular preference is given to tris(pentafluorophenyl) borane.

However it is preferred that borates are used, i.e. compounds containing a borate 3+ ion. Such ionic cocatalysts preferably contain a non-coordinating anion such as tetrakis (pentafluorophenyl)borate and tetraphenylborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N, N-dimethylanilinium.

Preferred ionic compounds which can be used according to the present invention include: triethylammoniumtetra (phenyl)borate,
tributylammoniumtetra(phenyl)borate,
trimethylammoniumtetra(tolyl)borate,
tributylammoniumtetra(tolyl)borate,
tributylammoniumtetra(pentafluorophenyl)borate,
tripropylammoniumtetra(dimethylphenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl) borate,
N,N-dimethylaniliniumtetra(phenyl)borate,
N,N-diethylaniliniumtetra(phenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakis(pentafluorophenyl)borate,
triphenylphosphoniumtetrakis(phenyl)borate,
triethylphosphoniumtetrakis(phenyl)borate,
diphenylphosphoniumtetrakis(phenyl)borate,
tri(methylphenyl)phosphoniumtetrakis(phenyl)borate,
tri(dimethylphenyl)phosphoniumtetrakis(phenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate or N,N-dimethylbenzylammoniumtetrakis(pentafluorophenyl)borate.

It has been surprisingly found that certain boron cocatalysts are especially preferred. Preferred borates of use in the invention therefore comprise the trityl ion. Thus the use of N,N-dimethylammonium-tetrakispentafluorophenylborate and $Ph_3CB(PhF_5)_4$ and analogues therefore are especially favoured.

According to the present invention, the preferred cocatalysts are alumoxanes, more preferably methylalumoxanes, combinations of alumoxanes with Al-alkyls, boron or borate cocatalysts, and combination of alumoxanes with boron-based cocatalysts.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

Catalyst Manufacture

The metallocene catalyst complex of the present invention can be used in combination with a suitable cocatalyst as a catalyst for the polymerization of propylene, e.g. in a solvent such as toluene or an aliphatic hydrocarbon, (i.e. for polymerization in solution), as it is well known in the art. Preferably, polymerization of propylene takes place in the condensed phase or in gas phase.

The catalyst of the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably the support is a porous material so that the complex may be loaded into the pores of the support, e.g. using a process analogous to those described in WO94/14856, WO95/12622 and WO2006/097497. The particle size is not critical but is preferably in the range 5 to 200 μm, more preferably 20 to 80 μm. The use of these supports is routine in the art.

In an alternative embodiment, no support is used at all. Such a catalyst can be prepared in solution, for example in an aromatic solvent like toluene, by contacting the metallocene (as a solid or as a solution) with the cocatalyst, for example methylaluminoxane or a borane or a borate salt previously dissolved in an aromatic solvent, or can be prepared by sequentially adding the dissolved catalyst components to the polymerization medium.

In one embodiment, no external carrier is used but the catalyst is still presented in solid particulate form. Thus, no external support material, such as inert organic or inorganic carrier, for example silica as described above is employed.

In order to provide the catalyst of the invention in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape, surface properties and particle size and without using any added external porous support material, such as an inorganic oxide, e.g. silica. By the term “preparing a solution of one or more catalyst components” is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

Full disclosure of the necessary process can be found in WO03/051934, which is herein incorporated by reference.

The invention is also industrially advantageous, since it enables the preparation of the solid particles to be carried out as a one-pot procedure. Continuous or semicontinuous processes are also possible for producing the catalyst.

Catalyst Off-Line Prepolymerization

The use of the heterogeneous catalysts, where no external support material is used (also called "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is possible to "off line prepolymerize" the catalyst before using it in polymerization process.

It has to be noted that off line prepolymerization in this regard is part of the catalyst preparation process, being a step carried out after a solid catalyst is formed. The catalyst off line prepolymerization step is not part of the actual polymerization process configuration comprising a prepolymerization step. After the catalyst off line prepolymerization step, the solid catalyst can be used in polymerization.

Catalyst "off line prepolymerization" takes place following the solidification step of the liquid-liquid emulsion process. Pre-polymerization may take place by known methods described in the art, such as that described in WO 2010/052263, WO 2010/052260 or WO 2010/052264. Preferable embodiments of this aspect of the invention are described herein.

As monomers in the catalyst off-line prepolymerization step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene, especially propylene.

The catalyst off-line prepolymerization may be carried out in gas phase or in an inert diluent, typically oil or fluorinated hydrocarbon, preferably in fluorinated hydrocarbons or mixture of fluorinated hydrocarbons. Preferably, perfluorinated hydrocarbons are used. The melting point of such (per) fluorinated hydrocarbons is typically in the range of 0 to 140° C., preferably 30 to 120° C., like 50 to 110° C.

Where the catalyst off line prepolymerization is done in fluorinated hydrocarbons, the temperature for the pre-polymerization step is below 70° C., e.g. in the range of −30 to 70° C., preferably 0-65° C. and more preferably in the range 20 to 55° C.

The pressure within the reaction vessel is preferably higher than atmospheric pressure to minimize the eventual leaching of air and/or moisture into the catalyst vessel. Preferably, the pressure is in the range of at least 1 to 15 bar, preferably 2 to 10 bar. The reaction vessel is preferably kept in an inert atmosphere, such as under nitrogen or argon or similar atmosphere.

Offline prepolymerization is continued until the desired pre-polymerization degree, defined as weight of polymer matrix/weight of solid catalyst before pre-polymerization step, is reached. The degree is below 25, preferably 0.5 to 10.0, more preferably 1.0 to 8.0, most preferably 2.0 to 6.0.

Use of the off-line catalyst prepolymerization step offers the advantage of minimising leaching of catalyst components and thus local overheating.

After offline prepolymerization, the catalyst can be isolated and stored.

Polymerisation

The propylene homopolymer (HPP) is preferably produced by a single- or multistage process polymerization of propylene such as bulk polymerization, gas phase polymerization, slurry polymerization, solution polymerization or combinations thereof. Preferably, the propylene homopolymer (HPP) can be made in a combination of loop and gas phase reactor. Those processes are well known to one skilled in the art.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

Component (b): Hydroxylamine Ester Compound

The visbroken polypropylene composition comprises 0.001-10.000 wt %, preferably 0.001-4.000 wt %, more preferably 0.500-3.500 wt % of a hydroxylamine ester compound as visbreaking agent.

Suitable visbreaking agent selected from the group of hydroxylamine esters are known in the state of the art, for example as described in WO 2007/126994, where it is stated that any hydroxylamine ester known in the art for reducing the molecular weight of or viscosity breaking, polyolefin compounds, particularly propylene polymers can be used. Such suitable hydroxylamine esters are generally described in WO 01/90113.

One preferred visbreaking agent selected from the group of hydroxylamine esters is Irgatec® CR76, sold commercially by Ciba Specialty Chemicals Corporation (now by BASF), which is also mentioned in WO 2007/126994.

Preferred hydroxylamine esters are compounds of the formula (I)

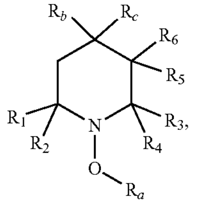

wherein $R_a$ represents acyl;

One of $R_b$ and $R_c$ represents hydrogen and the other one represents a substituent; or $R_b$ and $R_c$ both represent hydrogen or identical or different substituents; or $R_b$ and $R_c$ together represent oxygen;

$R_1$-$R_4$ each represent $C_1$-$C_6$alkyl; and $R_5$ and $R_6$ each represent independently of one another hydrogen, $C_1$-$C_6$alkyl or $C_6$-$C_{10}$aryl; or $R_5$ and $R_6$ together represent oxygen.

In the hydroxylamine ester (I) the term acyl with regard to the definition of $R_a$ preferably represents an acyl radical selected from the group consisting of —C(═O)—H, —C(═O)—$C_1$-$C_{19}$alkyl, —C(═O)—$C_2$-$C_{19}$alkenyl, —C(═O)—$C_2$-$C_4$alkenyl-$C_4$-$C_{10}$aryl, —C(═O)—$C_6$-$C_{10}$aryl, —C(═O)—O—$C_1$-$C_6$alkyl, —C(═O)—O—$C_6$-$C_{10}$aryl, —C(═O)—NH—$C_1$-$C_6$alkyl, —C(═O)—NH$C_6$-$C_{10}$aryl and —C(═O)—N($C_1$-$C_6$alkyl)$_2$;

$C_1$-$C_{19}$alkyl in the acyl group $R_a$ is, for example, $C_1$-$C_6$alkyl, e.g. methyl, ethyl, n-propyl or isopropyl or n-, sec- or tert-butyl or straight-chain or branched pentyl or hexyl, or $C_7$-$C_{19}$alkyl, e.g. straight-chain or branched heptyl, octyl, isooctyl, nonyl, tert-nonyl, decyl or undecyl, or straight-chain $C_{11}$-$C_{19}$alkyl, which together with the —(C═O)— radical forms $C_{14}$-$C_{20}$alkanoyl having an even number of C-atoms, e.g. lauroyl ($C_{12}$), myristoyl ($C_{14}$), palmitoyl ($C_{16}$) or stearoyl ($C_{18}$).

$C_6$-$C_{10}$Aryl is, for example, carbocyclic monoaryl or diaryl, preferably monoaryl, e.g. phenyl, which may be monosubstituted or disubstituted by suitable substituents, e.g. $C_1$-$C_4$alkyl, e.g. methyl, ethyl or tert-butyl, $C_1$-$C_4$alkoxy, e.g. methoxy or ethoxy, or halogen, e.g. chlorine. In the case of disubstitution, the 2- and 6-positions are preferred.

The above-mentioned acyl radical Ra may be substituted on the free valences by suitable substituents, e.g. fluorine or chlorine, and is preferably formyl, acetyl, trifluoroacetyl, pivaloyl, acryloyl, methacryloyl, oleoyl, cinnamoyl, benzoyl, 2,6-xyloyl, tert-butoxycarbonyl, ethylcarbmoyl or phenylcarbamoyl.

$C_1$-$C_6$Alkyl as $R_1$-$R_4$ is preferably $C_1$-$C_4$alkyl, in particular $C_1$-$C_2$alkyl, e.g. methyl or ethyl.

In preferred embodiments, $R_1$-$R_4$ are methyl or ethyl. Alternatively, from one to three substituents $R_1$-$R_4$ are ethyl. The remaining substituents are then methyl.

$R_5$ and $R_6$ are preferably hydrogen. $C_1$-$C_6$Alkyl or $C_6$-$C_{10}$aryl as $R_5$ and $R_6$ are preferably methyl or phenyl.

The hydroxylamine esters (I) are known or can be prepared by known methods, e.g. by acylation of the corresponding >N—OH compound in a customary esterification reaction with an acid $R_a$—OH that introduces the group $R_a$ and corresponds to an acyl group selected, for example, from the group consisting of —C(═O)—H, —C(═O)—$C_1$-$C_{19}$alkyl, —C(═O)—$C_2$-$C_{19}$alkenyl, —C(═O)—$C_2$-$C_4$alkenyl-$C_6$-$C_{10}$aryl, —C(═O)—$C_6$-$C_{10}$aryl, —C(═O)—O—$C_1$-$C_6$alkyl, —C(═O)—O—$C_6$-$C_{10}$aryl, —C(═O)—NH—$C_1$-$C_6$alkyl, —C(═O)—NH—$C_6$-$C_{10}$aryl and —C(═O)—N($C_1$-$C_6$alkyl)$_2$, or a reactive functional derivative thereof, e.g. the acid halide Ra—X, e.g. the acid chloride, or anhydride, e.g. $(R_a)_2O$. The hydroxylamine esters (I) and methods for their preparation are described in WO 01/30113.

A preferred hydroxylamine ester (I) is selected from the group consisting of sterically hindered amine derivatives of the formula:

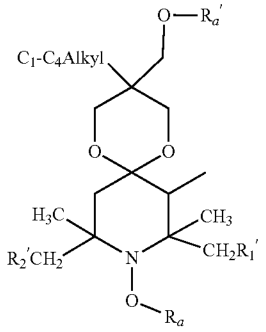

wherein $R_1$' and $R_2$' independently of one another represent hydrogen or methyl;

$R_a$ represents $C_1$-$C_5$ alkanoyl; and $R_a$' represents $C_5$-$C_{22}$alkanoyl.

According to a more preferred embodiment the hydroxylamine ester (I) is selected from the group consisting of sterically hindered amine derivatives of the formula:

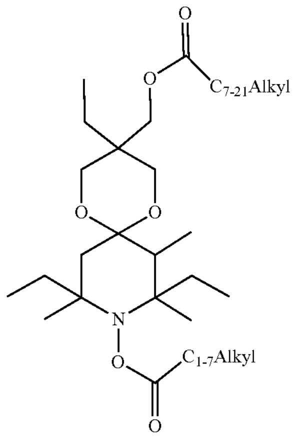

Most preferred is a compound of the above formula, in which the alkyl group is a $C_{17}$— group. Such a compound is commercially available under the tradename Irgatec® CR76, or now Irgatec® CR76 IC.

The polypropylene composition of the present invention may comprise further components. However, it is preferred that the inventive polypropylene composition comprises as polymer components only the polypropylene polymer as defined in the instant invention. Accordingly, the amount of polypropylene polymer may not result in 100.0 wt % based on the total polypropylene composition. Thus, the remaining part up to 100.0 wt % may be accomplished by further additives known in the art. However, this remaining part shall be not more than 5.0 wt %, like not more than 3.0 wt % within the total polypropylene composition. For instance, the inventive polypropylene composition may comprise additionally small amounts of additives selected from the group consisting of antioxidants, stabilizers, fillers, colorants, nucleating agents and antistatic agents. In general, they are incorporated during granulation of the powder product obtained in the polymerization. Accordingly, the polypropylene polymer constitutes at least to 95.0 wt %, more preferably at least 97.0 wt % to the total polypropylene composition.

Such additives are generally commercially available and are described, for example, in "Plastic Additives Handbook", pages 871 to 873, 5th edition, 2001 of Hans Zweifel.

Typically, mixing of polypropylene homopolymer (component A) and hydroxylamine ester compound (component B) in accordance with the present invention is carried out in an extruder. This step is also the so-called visbreaking step, where an increase of melt flow rate is obtained under the suitable conditions. During visbreaking, higher molar mass chains of the starting product are broken statistically more frequently than lower molar mass molecules, resulting as indicated above in an overall decrease of the average molecular weight and an increase in melt flow rate.

After mixing and visbreaking the polypropylene composition according to this invention is subjected into a pelletizer to be pelletized.

The instant polypropylene composition pellets is thereafter used for the preparation of the melt-blown fibers and subsequently to the melt-blown web or article according to the invention.

Thus, the above described polypropylene composition is used for preparing melt-blown fibers. Such melt-blown fibers have an average filament fineness of not more than 5 μm.

Furthermore, the melt-blown fibers comprise at least 80.0 wt %, preferably at least 85.0 wt %, more preferably at least 90.0 wt %, still more preferably at least 95.0 wt % based on the total weight of the melt-blown fibers, most preferably consist of, of the polypropylene composition as defined above.

Thus a further component may be present in the melt-blown fibers according to the invention. Such further component is a further polymer, which is preferably also a polypropylene based polymer.

It is within the skill of an art skilled person to choose a suitable additional polymer in a way that the desired properties of the melt-blown webs are not negatively affected.

The present invention is directed to melt-blown webs (MBW), made of these melt-blown fibers. Accordingly, the present invention is also directed to a melt-blown web comprising the melt-blown fibers made of the polypropylene composition as defined above.

Further, the present invention is also directed to an article selected from the group consisting of filtration media (filter), diapers, sanitary napkins, panty liners, incontinence products for adults, protective clothing, surgical drapes, surgical gown, and surgical wear in general, comprising the melt-blown web (MBW) according to the present invention, preferably in an amount of at least 80.0 wt %, more preferably in an amount of at least 95.0 wt %, based on the total weight of the article. In one embodiment of the present invention, the article consists of the melt-blown web (MBW).

The weight per unit area of the melt-blown web depends very much on the end use, however it is preferred that the melt-blown web is light weight which has a weight per unit area in the range from 0.5 to 15.0 g/m$^2$, preferably in the range from 1.0 to 12.0 g/m$^2$, more preferably in the range from 1.0 to 10.0 g/m$^2$.

The melt-blown web according to the invention being as a single layer web or a multi-layer construction containing the melt-blown web can be furthermore combined with other layers, i.e. polycarbonate layers or the like, depending on the desired end use of the produced article.

It is preferred that the melt-blown webs according to the present invention are free of shots.

According to the present invention, a shot in a melt-blown web is defined as a defect, deformation or hole in the web caused by an agglomeration of the fiber-forming polymer, said agglomeration having an equivalent diameter from 10 to 1000 times bigger than the average diameter of the fibers.

It is further preferred that the melt-blown webs according to the present invention have a hydrohead (3$^{rd}$ drop, cm $H_2O$ resp. mbar), measured according to standard test WSP 80.6 (09), of a melt-blown web (produced with 270° C. melt temperature) having a weight per unit area of 9.5±1.0 g/m$^2$, of at least 80 mbar, preferably of at least 85 mbar, and of a melt-blown web (produced with 290° C. melt temperature) having a weight per unit area of 9.5±1.0 g/m$^2$, of at least 130 mbar, preferably at least 135 mbar In the following the present invention is further illustrated by means of examples.

EXAMPLES

1. Measuring Methods

The following definitions of terms and determination methods apply for the above general description of the invention as well as to the below examples unless otherwise defined.

$MFR_2$ (230° C.) is measured according to ISO 1133 (230° C., 2.16 kg load).

Quantification of Microstructure by NMR Spectroscopy

Quantitative nuclear-magnetic resonance (NMR) spectroscopy was used to quantify the comonomer content of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimized 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimized tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol }\%]=100*fE$$

The weight percent comonomer incorporation was calculated from the mole fraction:

$$E[\text{wt }\%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The xylene solubles (XCS, wt.-%): Content of xylene cold solubles (XCS) is determined at 25° C. according ISO 16152; first edition; 2005 Jul. 1

Number average molecular weight ($M_n$), weight average molecular weight ($M_w$) and polydispersity ($M_w/M_n$) are determined by Gel Permeation Chromatography (GPC) according to the following method:

The weight average molecular weight $M_w$ and the polydispersity ($M_w/M_n$), wherein $M_n$ is the number average molecular weight and $M_w$ is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert:-butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

DSC analysis, melting temperature ($T_m$) and heat of fusion ($H_f$), crystallization temperature ($T_c$) and heat of crystallization ($H_c$): measured with a TA Instrument Q2000 differential scanning calorimetry (DSC) on 5 to 7 mg samples. DSC is run according to ISO 11357/part 3/method $C_2$ in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step.

The glass transition temperature $T_g$ is determined by dynamic mechanical analysis according to ISO 6721-7. The measurements are done in torsion mode on compression moulded samples (40×10×1 $mm^3$) between −100° C. and +150° C. with a heating rate of 2° C./min and a frequency of 1 Hz.

Grammage of the web: The unit weight (grammage) of the webs in $g/m^2$ was determined in accordance with ISO 536:1995.

Hydrohead: The hydrohead or water resistance as determined by a hydrostatic pressure test is determined according to the WSP (worldwide strategic partners) standard test WSP 80.6 (09) as published in December 2009. This industry standard is in turn based on ISO 811:1981 and uses specimens of 100 $cm^2$ at 23° C. with purified water as test liquid and a rate of increase of the water pressure of 10 cm/min. An $H_2O$ column height of X cm in this test corresponds to a pressure difference of X mbar.

Air permeability: The air permeability was determined in accordance with DIN ISO 9237 at a pressure difference of 100 Pa. This air permeability is defined as the velocity of an air flow passing perpendicularly through the web specimen.

Shots: "Shot" is a measure of the number of deformations, defects or holes in the formed polymer fabric. A defect can be, for example, an agglomeration of polymer material from 10 to 1000 times greater in diameter than the diameter of the fibers. Qualitative test methods for determining "shot" can be found in U.S. Pat. No. 5,723,217. Fabrics samples are pulled off the MB fabric roll at random and a section several feet long encompassing the full width of the fabric is cut from the roll. The samples are held against a backlit glass plate and visually rated from "1" to "5" according to the level of shot (1=no shot; "5"=very high level of shot). A set of photographs of MB fabrics containing shot levels corresponding to each category from 1 to 5 serve as standards for rating the fabrics. A shot value is then determined by counting the number of defects or holes per unit area. This can be done by, for example, viewing the fabric in a microscope and manually counting the number of shot per unit area. Also, see Yan, Z. and Bresee, R., Flexible Multifunctional Instrument for Automated Nonwoven Web Structure Analysis, 69 TEXTILE RES. J. 795-804 (1999).

2. Examples

The catalyst used in the polymerization process for the polypropylene homopolymer (HPP) of the inventive examples (IE1, 2, 3) was produced as follows:

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressuring and depressurizing with nitrogen using manual valves. Then toluene (22 kg) was added. The mixture was stirred for 15 min. Next 30 wt % solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated $SiO_2$ was dried at 60° under nitrogen flow for 2 hours and then for 5 hours under vacuum (−0.5 barg) with stirring. MAO treated support was collected as a free-flowing white powder found to contain 12.2% Al by weight.

Catalyst Synthesis 30 wt % MAO in toluene (0.7 kg) was added into a steel nitrogen blanked reactor via a burette at 20° C. Toluene (5.4 kg) was then added under stirring. Metallocene $C_2$ (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring.

Dried catalyst was sampled in the form of pink free flowing powder containing 13.9% Al and 0.11% Zr.

Polymerization of HPP and Blending with Hydroxylamine Ester

The polymerization conditions of HPP used as inventive examples in IE1.1 to IE1.4 are indicated in Table 1. The polymerization were carried on a Borstar pilot plant, with prepolymerizer, loop and first gas phase reactor connected sequentially, in the presence of the catalyst described above. The result polymer powder was compounded and pelletized with 1.1 wt % of Irgatec CR76 (BASF), 0.1 wt % of Irganox 1010 and 0.05 wt % of calcium stearate on the ZSK 57 twin screw extruder, with melt temperature of 190° C.

The properties measured on pellets and meltblown webs are shown in Table 1, too.

TABLE 1

Preparation of the Examples

| | | HPP |
|---|---|---|
| Prepoly reactor | | |
| Temperature | [° C.] | 28 |
| Pressure | [kPa] | 55000 |
| Loop reactor | | |
| Temperature | [° C.] | 85 |
| Pressure | [kPa] | 55000 |
| $MFR_2$ | [g/10 min] | 89 |
| XCS | [wt.-%] | 0.8 |
| Feed $H_2/C_3$ ratio | [mol/kmol] | 0.45 |
| Amount | [wt.-%] | 60 |
| GPR | | |
| Temperature | [° C.] | 90 |
| Pressure | [kPa] | 2500 |
| $MFR_2$ | [g/10 min] | 115 |
| $H_2/C_3$ ratio | [mol/kmol] | 5.8 |
| Amount | [wt.-%] | 40 |
| Pellets | | |
| $MFR_2$ | [g/10 min] | 129 |
| XCS | [wt.-%] | 0.9 |
| $T_m$ | [° C.] | 155 |
| $T_c$ | [° C.] | 117 |
| $M_w$ | [kg/mol] | 121 |
| $M_w/M_n$ | [—] | 4.0 |
| 2.1 | [mol %] | 0.6 |
| $T_g$ below −20° C. | [° C.] | n.d. |
| $T_g$ above −20° C. | [° C.] | −0.1 |

The polymer used in comparison examples CE1.1-CE1.2 is a metallocene based propylene-ethylene random copolymer having a MFR of 1100 g/l 0 min, a melting temperature of 134° C., and a total ethylene content of 3.4 wt %. The polymer powder was compounded and pelletized with 0.1 wt % of Irganox 10101 and 0.05 wt % of calcium stearate on the ZSK 57 twin screw extruder, with melt temperature of 190° C.

The polymer used in comparison examples CE2.1-2.3 is a ZN based polypropylene homopolymer, which has been disclosed in EP3034522 as main polymer in IE1.1 and IE1.2. Said propylene homopolymer has been visbroken by using a co-rotating twin-screw extruder at 200-230° C. and using 1.1 wt % of Irgatec® CR76.

The polypropylene compositions of IE1, CE1 and CE2 have been converted into melt-blown webs on a Reicofil MB250 line using a spinneret having 470 holes of 0.4 mm exit diameter and 35 holes per inch. Webs were produced at different melt-blow temperatures and air volumes, at the same throughput of 10 kg/h/m, and DCD (die to collector distance) of 200 mm.

The processing conditions for and properties of the melt-blown webs are indicated in table 2.

TABLE 2

Processing conditions for the production of the melt-blown webs and properties of the obtained melt-blown webs

| Example | Melt-blow Temperature [° C.] | Air volume [$m^3$/h] | Web weight [g/$m^2$] | Air permeability [mm/s] | Hydrohead ($3^{rd}$ drop) [cm $H_2O$]* | $M_w$ (web) | MWD (web) | Melt temperature $T_m$ (web) [° C.] |
|---|---|---|---|---|---|---|---|---|
| IEl-1 | 270 | 230 | 9.9 | 775 | 80.4 | 57,400 | 2.6 | 154 |
| IE 1-2 | 280 | 190 | 9.5 | 410 | 115 | 50,700 | 2.5 | 154 |
| IE 1-3 | 290 | 90 | 9.2 | 350 | 147.8 | 46,050 | 2.4 | 154 |

TABLE 2-continued

Processing conditions for the production of the melt-blown webs and properties of the obtained melt-blown webs

| Example | Melt-blow Temperature [° C.] | Air volume [$m^3$/h] | Web weight [g/$m^2$] | Air permeability [mm/s] | Hydrohead ($3^{rd}$ drop) [cm $H_2O$]* | $M_w$ (web) | MWD (web) | Melt temperature $T_m$ (web) [° C.] |
|---|---|---|---|---|---|---|---|---|
| IE 1-4 | 290 | 150 | 4.6 | 665 | 116 | 46,500 | 2.4 | 154 |
| CEl-1 | 270 | 290 | 9.1 | 652 | 65.7 | — | — | 134 |
| CEl-2 | 290 | 220 | 9.1 | 656 | 79 | — | — | 134 |
| CE2-1 | 270 | 360 | 9.4 | 823 | 88 | 62,300 | 3.94 | 162 |
| CE2-2 | 290 | 210 | 9.4 | 485 | 136.2 | 50,400 | 3.5 | 162 |
| CE2-3 | 290 | 260 | 4.9 | 994 | 87.5 | n.m. | n.m. | n.m. |

*also mbar

As can be seen from Table 2 that the use of the polymer composition of the inventive example yield webs with improved water barrier properties, appearing as higher hydrohead values (at the same or a lower web weight) compared to the comparative examples. The benefit is shown more pronounced in the web with lower thickness (i.e. lower web weight). With the similar web weight, IE1-4 gives 30% higher hydrohead than CE2-3.

The invention claimed is:

1. A melt-blown web comprising a polypropylene composition comprising:
(a) 90.000-99.999 wt % of a propylene homopolymer (HPP) polymerized in the presence of a metallocene catalyst, wherein the propylene homopolymer (H—PP) has a content of 2,1 erythro regiodefects as determined from $^{13}$C-NMR spectroscopy in the range from 0.50 to 0.80 mol %, and
(b) 0.001-10.000 wt % of a hydroxylamine ester compound,
wherein the polypropylene composition in said melt-blown web has
(i) a melting temperature ($T_m$) measured by differential scanning calorimetry (DSC) according to ISO 11357 in the range from 152 to 160° C.,
(ii) a molecular weight $M_w$(web) (measured with GPC on the web) of between 20000-200000 g/mol, and
(iii) a molecular weight distribution (MWD) of between 1.5-5.0.

2. The melt-blown web according to claim 1, wherein the propylene homopolymer (HPP) has an initial $MFR_2$ (230° C., 2.16 kg) determined according to ISO 1133 in the range of 20.0-250.0 g/10 min.

3. The melt-blown web according to claim 1, wherein the propylene homopolymer (HPP) has a xylene cold soluble fraction (XCS) determined at 23° C. according to ISO 16152 in the range of from 0.1 to 1.5 wt %.

4. The melt-blown web according to claim 1, wherein the propylene homopolymer (H-PP) has a content of 2,1 erythro regiodefects as determined from $^{13}$C-NMR spectroscopy in the range from 0.60 to 0.70 mol %.

5. The melt-blown web according to claim 1, wherein a final $MFR_2$ (230° C., 2.16 kg) determined on the melt blown web according to ISO 1133 is in the range of 600.0-5000.0 g/10 min, and/or
the visbreaking ratio [final $MFR_2$ (230° C./2.16 kg)/initial $MFR_2$ (230° C./2.16 kg)] is in the range of 5 to 250, wherein the final $MFR_2$ (230° C./2.16 kg) is the $MFR_2$ (230° C./2.16 kg) of the polypropylene composition in the melt-blown web and the initial $MFR_2$ (230° C./2.16 kg) is the $MFR_2$ (230° C./2.16 kg) of the propylene homopolymer (HPP).

6. The melt-blown web according to claim 1, wherein
(i) a molecular weight ($M_w$) ratio of the $M_w$ of the web to the $M_w$ of the propylene homopolymer (HPP) [$M_w$(web)/$M_w$(PP)] is <1, and
(ii) a molecular weight distribution (MWD) ratio of the MWD of the web to the MWD of the propylene homopolymer (HPP) [MWD(web)/MWD(PP)] is <1.

7. The melt-blown web according to claim 1, wherein the polypropylene composition in the melt-blown web has a molecular weight distribution (MWD) of between 2.0 to 3.2.

8. The melt-blown web according to claim 1, wherein the propylene homopolymer (HPP) is polymerized in the presence of a metallocene catalyst complex of formula (I):

(I)

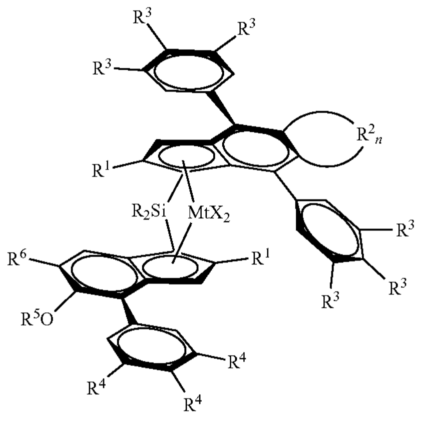

wherein
Mt is Hf or Zr;
each X is a sigma-ligand,
each $R^1$ independently is the same or different and is a $CH_2$—$R^7$ group, with $R^7$ being H or linear or branched $C_{1-6}$-alkyl group, $C_{3-8}$ cycloalkyl group, $C_{6-10}$ aryl group,
each $R^2$ is independently a —CH=, —CY=, —$CH_2$—, —CHY— or —$CY_2$— group, wherein Y is a $C_{1-10}$ hydrocarbyl group and where n is 2-6,
each $R^3$ and $R^4$ are independently the same or different and are hydrogen, a linear or branched $C_1$-$C_6$-alkyl group, an OY group or a $C_{7-20}$ arylalkyl, $C_{7-20}$ alkylaryl group or $C_{6-20}$ aryl group, whereby at least one $R^3$ per phenyl group and at least one $R^4$ is not hydrogen, and optionally two adjacent $R^3$ or $R^4$ groups can be part of a ring including the phenyl carbons to which they are bonded, $R^5$ is a linear or branched $C_1$-$C_6$-alkyl group, $C_{7-20}$ arylalkyl, $C_{7-20}$ alkylaryl group or $C_6$-$C_{20}$-aryl group, $R^6$ is a $C(R^8)$: group, with $R^8$ being a linear or branched $C_1$-$C_6$ alkyl group, and each R is independently a $C_1$-$C_{20}$-hydrocarbyl, $C_6$-$C_{20}$-aryl, $C_7$-$C_{20}$-arylalkyl or $C_7$-$C_{20}$-alkylaryl.

9. The melt-blown web according to claim 8, wherein the propylene homopolymer (HPP) is polymerized in the presence of a metallocene catalyst complex, wherein:

Mt is Zr, each X is independently a hydrogen atom, a halogen atom, $C_{1-6}$ alkoxy group or an R' group, where R' is a $C_{1-6}$ alkyl, phenyl or benzyl group, each R is independently a $C_1$-$C_{20}$-hydrocarbyl, $C_6$-$C_{20}$-aryl, $C_7$-$C_{20}$-arylalkyl or $C_7$-$C_{20}$-alkylaryl, each $R^1$ independently is the same or different and is a $CH_2$—$R^7$ group, with $R^7$ being H or linear or branched $C_{1-6}$-alkyl group, $C_{6-10}$ aryl group, each $R^2$ is independently a —CH═, —CY═, —$CH_2$—, —CHY— or —$CY_2$— group, wherein Y is a $C_{1-4}$ hydrocarbyl group and where n is 3-4, each $R^3$ and $R^4$ are independently the same or different and are hydrogen, a linear or branched $C_1$-$C_6$-alkyl group or $C_{6-20}$ aryl groups, whereby at least one $R^3$ per phenyl group and at least one $R^4$ is not hydrogen, $R^5$ is a linear or branched $C_1$-$C_6$ alkyl group or $C_{6-20}$ aryl group, and $R^6$ is a $C(R^8)_3$ group, with $R^8$ being a linear or branched $C_1$-$C_4$ alkyl group.

10. The melt-blown web according to claim 9, wherein the propylene homopolymer (HPP) is polymerized in the presence of a metallocene catalyst complex, wherein:

Mt is Zr, each X is independently a chlorine, benzyl or a methyl group, each R is independently a $C_1$-$C_{10}$-hydrocarbyl or $C_6$-$C_{10}$-aryl group, both $R^1$ are the same and are a $CH_2$—$R^7$ group, with $R^7$ being H or linear or branched $C_1$-$C_3$-alkyl group, each $R^2$ is independently a —CH═, —CY═, —$CH_2$—, —CHY— or —$CY_2$— group, wherein Y is a $C_{1-4}$ hydrocarbyl group and where n is 3-4, each $R^3$ and $R^4$ are independently the same or different and are hydrogen, a linear or branched $C_1$-$C_6$-alkyl group or $C_6$-20 aryl groups, whereby at least one $R^3$ per phenyl group and at least one $R^4$ is not hydrogen, $R^5$ is a linear or branched $C_1$-$C_6$ alkyl group or $C_{6-20}$ aryl group, and $R^6$ is a $C(R^8)$ 3 group, $R^8$ being the same and being a $C_1$-$C_2$-alkyl group.

11. The melt-blown web according to claim 1, wherein the propylene homopolymer (HPP) is polymerized in the presence of a metallocene catalyst system comprising (i) a metallocene catalyst complex of formula (I):

(I)

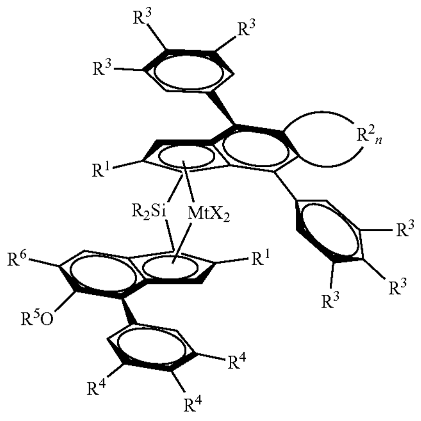

wherein

Mt is Hf or Zr;

each X is a sigma-ligand, each $R^1$ independently is the same or different and is a $CH_2$—$R^7$ group, with $R^7$ being H or linear or branched $C_{1-6}$-alkyl group, $C_{3-8}$ cycloalkyl group, $C_{6-10}$ aryl group, each $R^2$ is independently a —CH═, —CY═, —$CH_2$—, —CHY— or —$CY_2$— group, wherein Y is a $C_1$-10 hydrocarbyl group and where n is 2-6, each $R^3$ and $R^4$ are independently the same or different and are hydrogen, a linear or branched $C_1$-$C_6$-alkyl group, an OY group or a $C_{7-20}$ arylalkyl, $C_{7-20}$ alkylaryl group or $C_{6-20}$ aryl group, whereby at least one $R^3$ per phenyl group and at least one $R^4$ is not hydrogen, and optionally two adjacent $R^3$ or $R^4$ groups can be part of a ring including the phenyl carbons to which they are bonded, $R^5$ is a linear or branched $C_1$-$C_6$-alkyl group, $C_{7-20}$ arylalkyl, $C_{7-20}$ alkylaryl group or $C_6$-$C_{20}$-aryl group, $R^6$ is a $C(R^8)_3$ group, with $R^8$ being a linear or branched $C_1$-$C_6$ alkyl group, and each R is independently a $C_1$-$C_{20}$-hydrocarbyl, $C_6$-$C_{20}$-aryl, $C_7$-$C_{20}$-arylalkyl or $C_7$-$C_{20}$-alkylaryl; and (ii) a cocatalyst comprising a compound of a group 13 metal.

12. The melt-blown web according to claim 11, wherein the metallocene catalyst system comprises as cocatalyst (ii) alumoxane, combinations of alumoxane with Al-alkyls, boron or borate cocatalysts, and combination of alumoxanes with boron-based cocatalysts.

13. The melt-blown web according to claim 1, wherein the hydroxylamine ester compound is selected from the group consisting of sterically hindered amine derivatives of the formula:

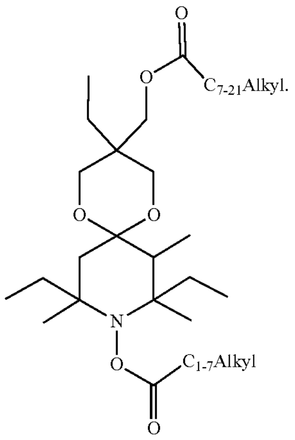

14. The melt-blown web according to claim 1, wherein the melt-blown web is free of shots, and has a weight per unit area in the range of 0.5 to 15.0 $g/m^2$.

15. A process for preparing a melt-blown web, comprising the steps of:

(i) polymerizing a propylene homopolymer (HPP) in the presence of a metallocene catalyst system, wherein the propylene homopolymer (H-PP) has a content of 2,1 erythro regiodefects as determined from $^{13}C$-NMR spectroscopy in the range from 0.50 to 0.80 mol %, (ii) mixing 90.000 to 99.999 wt % of the propylene homopolymer (HPP) obtained in step (i) together with 0.001-10.000 wt % of a hydroxylamine ester compound, (iii) pelletizing the mixture obtained in step (ii) in a pelletizer, and (iv) melt-blowing the blend pellets obtained in step (iii) into a web.

16. A method of improving the melt blown web quality characterized by increased hydrohead determined according to standard test WSP 80.6 (09), the method comprising using a polypropylene composition in a melt-blown web comprising:

(a) 90.000-99.999 wt % of a propylene homopolymer (HPP) polymerized in the presence of a metallocene catalyst, wherein the propylene homopolymer (H-PP) has a content of 2,1 erythro regiodefects as determined from $^{13}C$-NMR spectroscopy in the range from 0.50 to 0.80 mol %, and (b) 0.001-10.000 wt % of a hydroxylamine ester compound, wherein the polypropylene composition in said melt-blown web has (i) a melting temperature ($T_m$) measured by differential scanning calorimetry (DSC) according to ISO 11357 in the range from 152 to 160° C., (ii) a molecular weight $M_w$(web) (measured with GPC on the web) of between 20000-200000 g/mol, and (iii) a molecular weight distribution (MWD) of between 1.5-5.0.

* * * * *